United States Patent Office 2,741,726
Patented Apr. 10, 1956

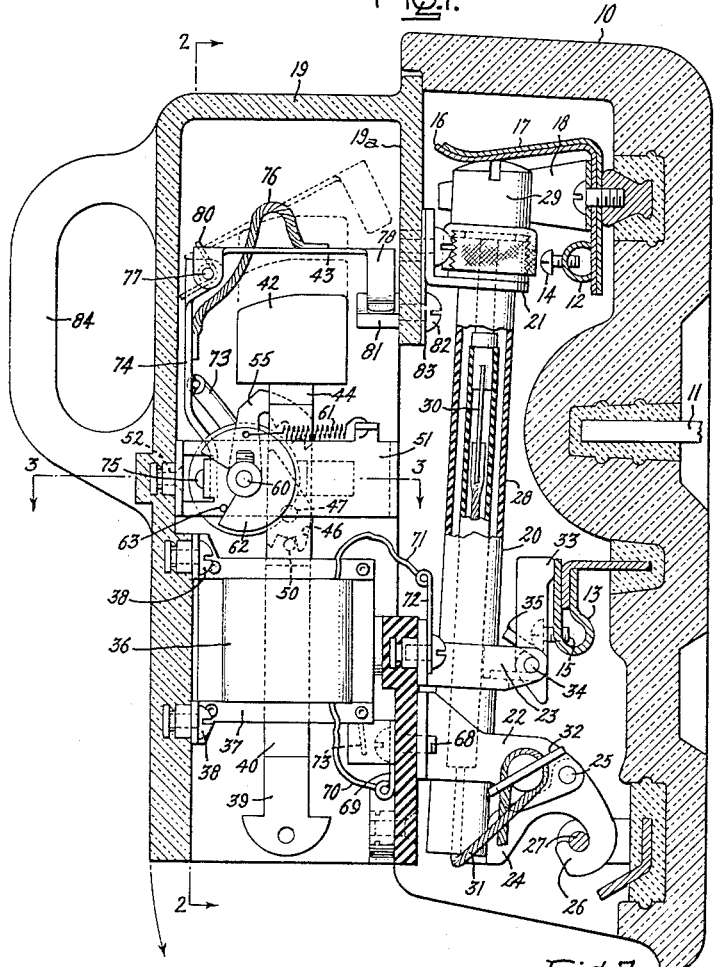

2,741,726

CIRCUIT ISOLATING DEVICE

Robert A. Branflick, Stockbridge, and Sidney R. Smith, Jr., Pittsfield, Mass., assignors to General Electric Company, a corporation of New York Application May 7, 1952, Serial No. 286,538

11 Claims. (Cl. 317—37)

This invention relates to a circuit sectionalizing or isolating device and more particularly to an automatic fuse by-pass type of circuit opening or isolating device adapted for use in connection with automatically operated reclosing circuit breakers in electric power distribution systems.

Heretofore, both fuses and automatic circuit opening devices have been employed in such distribution systems to perform an isolating or sectionalizing function in the event of the occurrence of a permanent heavy current fault or short circuit in a branch circuit or in a distribution transformer therein. However, such prior devices possess certain disadvantages which it would be desirable to overcome. For example, the employment of the recloser circuit breaker-fuse combination necessitates the use at various sectionalizing points in a distribution system of fuses each having a different rating. Such fuses, if not carefully coordinated with the tripping time of the recloser, are liable to rupture prior to the occurrence of the desired predetermined number of operations thereof. On the other hand, the relatively high cost of the fuseless type circuit opening devices at the present time prohibits its widespread use in combination with a recloser on all of the branches of a power distribution system. Although a less costly fuse by-pass type of isolator known to applicants has been suggested to overcome these disadvantages, it is far from satisfactory inasmuch as the device is sensitive to the duration, as well as to magnitude, of a fault current and therefore cannot be depended upon to discount one or more temporary faults. Thus, it may open a circuit on the first surge or impulse of fault current, even though the fault is only temporary.

It is therefor an object of the invention to provide a new and improved fuse by-pass type of isolator which will permit standardizing on only one fuse rating for an entire distribution circuit dependent only upon the smallest rating of the recloser circuit breaker in connection with which such isolators are employed.

It is also an object of the invention to provide a circuit opening or isolating device of the fuse by-pass type which will be operative in response to a predetermined number of fault current impulses but independent of the duration of such impulses.

It is a further object of this invention to provide an automatic circuit opening or sectionalizing device which is so simple in construction compared with prior art fuseless sectionalizing devices that its initial cost will permit its use where, for economic reasons, the employment of automatic fuseless devices would be precluded.

It is still a further object of this invention to provide a fuse by-pass type of isolator which is simple and compact and may be used in connection with the prior art holders for fuse cutouts.

The invention will be better understood from the following description taken in connection with the accompanying drawing, and the scope of the invention will be pointed out in the appended claims. In the drawing Fig. 1 is a side view partly in section of our improved isolating device; Fig. 2 is a sectional view taken on the line 2—2 of Fig. 1; Fig. 3 is a sectional view taken on the line 3—3 of Fig. 1, Figs. 4, 5, 6 and 7 respectively represent successive positions of blocking elements in our device and Fig. 8 is a more or less schematic wiring diagram of our isolating device.

Referring now to Figs. 1 and 2 of the drawing, we have illustrated our invention in connection with a housing 10 of porcelain or similar insulating material of the size and shape used for fuse cutouts of the prior art, such as is disclosed for example in United States Letters Patent 2,081,813, assigned to the same assignee as the present application. To the rear of the housing or casing 10 is secured a mounting bar 11 for the attachment of the casing to an electric line pole and cross-arm structure or the like. Conductors which are brought into the housing through holes in the housing side walls are adapted to be connected to terminals 12 and 13 by means of binding screws 14 and 15 respectively. Upper terminal 12 has a contact finger 16 backed up by means of a spring strip 17 which serves to press or bias the finger 16 downwardly and has also a pair of spaced resilient contact latching fingers 18, only one of which can be seen in the drawing.

A movable door or cover 19, preferably constructed of insulating material, is provided for housing 10 and suitably supports a fuse 20 on one side of a door partition 19a and our fuse by-pass and fault impulse responsive elements to be described hereinafter on the opposite side of partition 19a. Fuse 20 is directly supported by and accommodated in apertures in an upper support bracket 21 of conducting material, a lower door support bracket 22 of metallic conducting material and an intermediate contact support bracket 23 also of metallic conducting material each of which brackets are fixed in any suitable manner as by screws to door partition 19a. A metal lever 24 pivotally connected by a pin 25 to support bracket 22 supports door 19. Lever 24 is provided with a hook portion 26 which passes over a pivotal pin 27 secured to casing or housing 10. Fuse 20 is comprised of a tube 28 of insulating material having the upper end thereof secured to bracket 21 which has an externally threaded portion upon which a contact cap 29 is threaded. As better indicated in Fig. 1, when the cover is closed contact cap 29 of fuse 20 passes between the two latching fingers 18 and engages contact finger 16 all of which are electrically connected to terminal 12. Back up spring 17 provides the desired contact pressure between finger 16 and cap 29. A fuse link having a fusible element 30 located within the tube 28 is electrically connected to the contact cap 29 at one end and has a conductor 31 which extends from the bottom of the tube and is connected to metallic bracket 22 by means of a thumb screw 32 and nut threaded thereon. Conductor 31 is clamped either between the nut threaded on screw 32 or a shoulder thereon and bracket 22 as illustrated. Hook shaped door support lever 24 is thus held in close engagement with tube 28 of fuse 20 by the tension of the fuse link against the biasing action of back up spring 17 and the force of gravity, tending to separate these two elements. Lever 24 is maintained in this position so long as the fuse link remains intact or as long as fusible element 30 remains in an unfused state. Otherwise, it will be understood that the door and elements mounted thereon would drop downward until contact cap 29 moved out of engagement with latching fingers 18 whereupon the door would be permitted to rotate counterclockwise about pivot pin 27.

The portion of intermediate contact support bracket 23 to the right of fuse tube 28, as viewed in Fig. 1, is bifurcated to form a fork only one arm of which is illustrated in the drawing. Bracket 23 is electrically connected to the lower contact terminal 13 by means of a contact finger 33 which is pivotally connected between the forks of bracket 23 at 34. Contact finger 33 is biased in a clockwise direction by a coil spring 35 to provide the desired contact pressure. This biasing action also tends to separate fuse tube 28 from lever 24 and urge cover 19 and its connected parts to the open position against the action of the fuse link tending to maintain these elements together.

The fuse by-pass and fault impulse responsive elements comprise an electromagnet 36 mounted on its frame 37 which is, in turn, rigidly mounted on cover 19 by means of screws 38, and an armature 39. Armature 39 is provided with an integral extension portion comprising two parallel spaced bars 40 and 41 between the upper ends of which is positioned a switch opening element of insulating material consisting of a switch abutting portion 42 having a smooth upper curved surface for smooth engagement with a switch arm 43 and a pair of spaced parallel legs 44 and 45 integral with abutting portion 42 and respectively fixed in any suitable manner such as by screws or rivets to bars 40 and 41. A dog 46 is positioned in the space between legs 44 and 45 and mounted for rotation therein on a pivot 47 carried by bars and legs 40, 44 and 41, 45. An edge of a slotted portion 48 of dog 46 is normally biased by a spring 49 into engagement with a pin 50 fixedly mounted on the legs 44 and 45 so that dog 46 normally assumes the position with respect to the armature extension as illustrated in Figs. 1 and 7. In addition to electromagnet 36, there is also supported on door 19 a blocking means and switch arm support element comprising a U-shaped metallic bracket 51 fixed to the door in any suitable manner as by screws 52 and having a pair of parallel sides 53 and 54 spaced sufficiently so as to permit free movement of the armature extension therebetween. Intermediate the parallel sides 53 and 54 of bracket 51 is positioned a blocking means comprising an arm 55 having notches 56, 57 and 58 defined by adjacently positioned teeth in an edge thereof. Arm 55 is fixed by set screws 59 to a shaft 60 which extends through support bearing apertures in and is rotatably movable with respect to the parallel sides of bracket 51. Arm 55 and the notches or teeth thereon are normally biased to a position between legs 44 and 45 and in the path of movement of dog 46, as illustrated in Fig. 1, by a spring 61 one end of which is connected to bracket 51 and the other end of which is connected to a notched disk 62 mounted on and fixed by a set screw to one of the extending ends of shaft 60. Clockwise rotation, as viewed in Fig. 1, of arm 55 beyond the position illustrated in this figure is limited by engagement of an edge of the notch in the disk 62 with a stationary pin 63 fixed to side 53 of bracket 51. A disk 64 is suitably fixed to the other extending end of shaft 60 and comprises one element of a time delay means consisting of an enclosed casing 65 supported by a bracket 66 mounted on bracket 51 with the space within the casing between the inside walls thereof and disk 64 filled with silicone putty 67 which is a material that will resist rapid clockwise rotation of disk 64 and arm 55 under the biasing action of spring 61 following rotation of arm 55 in a counterclockwise direction to a position such as is illustrated in Fig. 7.

Conductor 31 of the fuse link and lower support bracket 22 are electrically connected in any suitable manner such as through the bracket mounting screws 68 to a copper strip 69 which in turn is electrically connected to one end of the winding of electromagnet 36 through a flexible conductor 70 while the other end of the winding is electrically connected to intermediate contact support bracket 23 and thus to contact finger 33 through a flexible conductor 71 and a copper strip 72 which is mounted in electrical contact engagement with contact support 23. Contact support 23 and contact finger 33 are also electrically connected, through the winding 36 by another flexible conductor 73 to an upstanding switch support bracket 74 of conducting material which is fixed to or supported on bracket 51 in any suitable manner such as by rivets 75 as illustrated. Switch arm 43 which is electrically connected through a flexible conductor 76 to bracket 74 is pivotally mounted on the upper end thereof by means of a pivot pin 77. The free end of switch arm 43 is provided with a pair of resilient contact fingers 78 and 79 which are normally biased by a coil spring 80 into engagement with a copper contact block 81 which is fixedly mounted on partition 19a by screws 82 and electrically connected to fuse contact cap 29 through a copper strip 83.

Thus, under normal current conditions when the elements of the device are in the position as illustrated in Fig. 1, the fuse link and fusible element 30 thereof are by-passed, as schematically illustrated in Fig. 8, by a relatively low resistance parallel circuit from terminal contact cap 29 and terminal 12 electrically connected thereto through bracket 21, copper strip 83, screws 82, contact block 81, switch 43, conductor 76, switch support bracket 74, flexible conductor 73, copper strip 69 to which the lower end of conductor 73 is electrically connected, the winding of electromagnet 36, copper strip 72, bracket 23, contact finger 33 to lower terminal 13.

Upon the occurrence of a fault above a predetermined value on the branch in which the device has been connected, the electromagnet 36 will be sufficiently energized to pull armature 39 and switch abutting portion 42 of switch opening element mounted on the upper extension of armature 39 upwardly toward pivoted switch arm 43. This upward motion of the armature will move the relatively pointed upper end of dog 46 mounted on the armature extension into engagement with notch 56 of arm 55 whereupon both the dog 46 and arm 55 will be rotated counterclockwise together until an edge of notch 48 of dog 46 engages pin 50 as illustrated in Fig. 4. This action thus tends to move the arm 55 in a direction toward a position out of the upward path of movement of dog 46 and the engagement of dog 46 with arm 55 and with pin 50 terminates or arrests further upward travel of switch abutting portion 42 just short of engagement with the switch 43. Promptly following this first impulse of current above a predetermined value, a conventional automatic recloser which has also operated in response to this value of current and is located in the circuit closer to the power source, will interrupt the circuit. Since electromagnet 36 will thereby be deenergized, armature 39 and switch opening element 42 will drop downwardly and the upper pointed end of dog 46 will become disengaged from the arm 55. Thereupon, spring 49 which has previously been stressed by the rotation of the dog with the arm 55 will be effective to rotate the dog 46 clockwise back to the position illustrated in Fig. 1. Likewise spring 61 will tend to return arm 55 back to its original position. If the fault is still on the branch, armature 39 will again be attracted upwardly and be effective to move dog 46 into engagement with arm 55. However, by virtue of time delay mechanism 64, 65, 67 connected through shaft 60 to arm 55, notch 56 thereon will not have returned, under the biasing action of spring 61, into the path of movement of dog 46 so that upon the occurrence of this second upward travel of armature 39, dog 46 will engage notch 57 or the tooth adjacent thereto whereby arm 55 will be further rotated toward a position out of the path of travel of dog 46 as illustrated in Fig. 5 and the upward travel of element 42 will again be arrested just short of engagement with switch arm 43. When electromagnet 36 is energized by a third current impulse of fault current following a second interruption and reclosing of the recloser, dog 46 will engage the tooth adjacent to notch 58 of arm 55 and rotate arm 55 completely out of the normal path of movement of dog 46 to the position illustrated by Fig. 6. Thus, upon the occurrence of a fourth current impulse of fault magnitude subsequent to a third interruption and reclosing of the recloser, dog 46, since time delay means 64, 65, 67 will have delayed return of any portion of blocking arm 55 into the path of movement thereof, will be free for the first time to move upwardly to the position illustrated in Fig. 7. As a result, abutting portion 42 will engage switch arm 43 and rotate it counterclockwise to the dotted position shown in Fig. 1 whereby contact fingers 78 and 79 will become disengaged from contact block 81 thus breaking the shunt or parallel by-pass circuit around the fuse link and subjecting the fusible element thereof to the fault current. Thereupon, fusible element 30 will fuse or rupture causing conductor 31 to be blown from the open end of tube 28 and thus release the tension which secured lever 24 in engagement with tube 28 whereby cover 19 and all the elements mounted thereon will drop downwardly and outwardly until contact cap 29 moves to a point below and out of engagement with latching fingers 18 when the door will then rotate counterclockwise about pin 27 to a fully open position to isolate the terminals 12 and 13 from each other and the branch to which the device is connected from the balance of the distribution system. Where the recloser is of the conventional type operating on a fourth fault impulse to lock open, the fourth opening of the recloser is suitably delayed to permit the by-pass switch 43 to open and the fusible element 30 to fuse before the recloser locks open.

It will be apparent that if a fault is removed from the circuit at any time prior to a fourth impulse of fault current, arm 55 will be reset to its initial position in the path of movement of dog 46 by the biasing action of spring 61 and the device and its branch circuit will remain connected to the balance of the distribution system. Likewise, it will be understood that subsequent to a fuse rupture and door opening operation, arm 55 will automatically reset and switch arm 43, as well, will also reset to a closed position under the biasing action of spring 80. Thus, aside from installation of a new fuse link in tube 28, the door 19 will be ready to be closed for subsequent connection of the branch circuit to the system following removal of the fault from the branch circuit. For manual opening of the device or isolation of a branch circuit, cover 19 is provided with a handle 84 which will facilitate the movement of contact cap 29 in a lateral direction against the biasing and holding action of contact fingers 18 and counterclockwise rotation of all the elements mounted on the door about pivot pin 27.

Although the particular device hereinbefore described is effective to isolate a branch upon the occurrence of a fourth current impulse of fault magnitude or subsequent to a third interruption of the circuit by a recloser, it will be obvious to those skilled in the art that by the subtraction or addition of notches or teeth on arm 51, such a device could be rendered effective to isolate a branch subsequent to a single or any higher number of interruptions of a recloser. Therefore, one operative to perform this function subsequent to a third interruption may be employed in a main feeder, one operative subsequent to a second interruption may be employed in a main branch connected to the main feeder and one operative subsequent to a first interruption may be employed in each of several sub-branches connected to the main branch.

Thus, we have provided a fuse by-pass type of isolating device the operation of which is independent of the duration of a fault impulse but operative only in response to a predetermined number of fault impulses independent of the duration of any one of such impulses thus permitting the employment of fusible elements all of the same current rating in a plurality of such devices installed at various points in the same distribution system. Furthermore, we have provided an isolating device which because of its general simplicity may be manufactured and sold for a relatively small price compared to the cost of prior art fuseless sectionalizing devices whereby the employment of a larger number of such devices to isolate faults to the smallest portion of a power distribution system is now more economically feasible.

While we have, in accordance with the patent statutes, shown and described a particular embodiment of our invention, it will be obvious that changes or modifications may be made without departing from the invention in its broader aspects and we, therefore, aim in the appended claims to cover all such changes and modifications as fall within the true spirit and scope of the invention.

What we claim as new and desire to secure by Letters Patent of the United States is:

1. A circuit isolating device comprising a pair of co-operatively engageable contacts, means biasing one of said contacts out of engagement with the other contact, fusible means operative when in an unfused state to hold said contacts in engagement against the biasing action of said biasing means, said fusible means being rupturable in response to a current through said contacts above a predetermined valve to cause disengagement of said contacts, a circuit electrically in parallel with said fusible means, a normally closed switch in said parallel circuit, an electromagnet having a winding connected in series relationship with said contacts, an armature for said electromagnet movable from an at-rest position to an extreme attracted position in response to said current above a predetermined value to effect opening of said switch, blocking means to block opening of said switch upon the occurrence of a first current impulse through said contacts above said predetermined valve comprising a dog pivotally mounted on said armature and movable therewith and an arm having notches thereon in the path of movement of said dog, said arm being pivotally mounted and rotatably movable out of said path, said dog engageable with a notch on and rotatable with said arm in response to a first current impulse through said contacts above said predetermined valve to rotate said arm in a direction toward a predetermined position out of said path whereby said armature will be effective to open said switch and cause rupture of said fusible means upon the occurrence of a subsequent current impulse through said contacts above said predetermined valve.

2. A circuit isolating device comprising a pair of co-operatively engageable contacts, means biasing one of said contacts out of engagement with the other contact, fusible means operative when in an unfused state to hold said contacts in engagement against the biasing action of said biasing means, said fusible means being rupturable in response to a current through said contacts above a predetermined valve to cause disengagement thereof, a circuit having a resistance lower than the resistance of said fusible means electrically in parallel therewith, a normally closed switch in said parallel circuit, means movable from a normal at-rest position in response to successive current impulses through said contacts above a predetermined valve to an extreme position to effect opening of said switch upon the occurrence of a predetermined one of said successive impulses, a dog movable with said current responsive means and an arm having notches thereon in the path of movement of said dog and effective to block opening of said switch, said arm being pivotally mounted and rotatably movable out of said path, said dog being pivotally mounted and operative for successive engagements with adjacently positioned notches on and rotation with said arm respectively in response to said successive current impulses through said contacts above said predetermined valve to successively and respectively rotate said arm in a direction toward a position out of said path whereby said current responsive means will be effective to open said switch and cause rupture of said fusible means upon the occurrence of a subsequent impulse through said contacts above said predetermined valve.

3. A circuit isolating device comprising a pair of normally closed electrical contacts, a current responsive means responsive to a current impulse through said contacts above a predetermined value and including a movable element operatively movable in a direction towards a predetermined position each time said means responds to a current impulse above said predetermined value, means carried by said movable element engageable with one of said contacts upon movement of said movable element to said predetermined position for effecting the opening of said contacts, blocking means to block engagement of said carried means with said one contact and opening of said contacts upon the occurrence of a first current impulse through said contacts above said predetermined value comprising a dog mounted on a pivot on said movable element and movable therewith, a pin fixedly mounted on said movable element and engageable with said dog to limit the rotation thereof about said pivot, a pivotally mounted arm having notches thereon and a biasing means normally biasing said arm and notches into the path of movement of said dog, said arm being rotatably movable out of said path, said dog engageable with a notch on and rotatable with said arm in response to a first current impulse through said contacts above said predetermined value to rotate said arm against the biasing action of said biasing means a predetermined distance limited by engagement of said dog with said pin in a direction towards a predetermined position out of said path and time delay means operatively connected to said arm and effective to delay return thereof toward said path of movement whereby said movable element will be free to move to said predetermined position and cause engagement of said carried means with said one contact and opening of said contacts upon the occurrence of a subsequent current impulse through said contacts above said predetermined value.

4. A circuit isolating device comprising a pair of cooperatively engageable contacts, means biasing one of said contacts out of engagement with the other contact, fusible means operative when in an unfused state to hold said contacts in engagement against the biasing action of said biasing means, said fusible means being rupturable in response to a current through said contacts above a predetermined value to cause disengagement thereof, a circuit having a resistance lower than the resistance of said fusible means electrically in parallel therewith, a normally closed switch in said parallel circuit, means movable from a normally at-rest position in response to successive current impulses through said contacts above a predetermined value to an extreme position to effect opening of said switch upon the occurrence of a predetermined one of said successive impulses, blocking means spring action biased into the path of movement of said movable current responsive means and operative to block movement thereof to said extreme position and opening of said switch upon the occurrence of a first current impulse through said contacts above said predetermined value including means connected to said current responsive means engageable with said blocking means and operative in response to a predetermined number of movements of said movable current responsive means respectively upon the occurrence of closely succeeding current impulses above said predetermined value to move said blocking means out of said path of movement and time delay means operatively connected to said blocking means and effective against said spring action to delay return thereof, between said predetermined movement, to the position from which is has been moved.

5. A circuit isolating device comprising a pair of cooperatively engageable contacts, means biasing one of said contacts out of engagement with the other contact, fusible means operative when in an unfused state to hold said contacts in engagement against the biasing action of said biasing means, said fusible means being rupturable in response to a current through said contacts above a predetermined value to cause disengagement of said contacts, a circuit having a resistance lower than the resistance of said fusible means electrically in parallel therewith, a normally closed switch in said parallel circuit and means engageable with said switch and movable in response to a current through said contacts above a predetermined value, said current responsive means being operative upon the occurrence of a predetermined one of successive current impulses following an initial current impulse through said contacts above said predetermined value to engage and move said switch to an open position and cause rupture of said fusible means.

6. A circuit isolating device comprising a pair of cooperatively engageable contacts, means biasing one of said contacts out of engagement with the other contact, fusible means operative when in an unfused state to hold said contacts in engagement against the biasing action of said biasing means, said fusible means being rupturable in response to a current through said contacts above a predetermined value to cause disengagement thereof, a circuit having a resistance lower than the resistance of said fusible means electrically in parallel therewith, a norcally closed switch in said parallel circuit, means movable from a normally at-rest position in response to a current impulse through said contacts above a predetermined value to an extreme position to effect opening of said switch and cause rupture of said fusible means, a blocking and counting means in the path of movement of said movable current responsive means and movable out of said path, said blocking and counting means being operative in response to the occurrence of closely succeeding current impulses through said contacts above said predetermined value to count and block movement of said current responsive means to said extreme position for a predetermined number of said succeeding impulses and thereafter permit movement of said current responsive means to said extreme position and opening of said switch upon the occurrence of a subsequent current impulse through said contacts above said predetermined value.

7. A fault responsive circuit whereby said circuit is opened responsive only to a subsequent fault current impulse therethrough following a preceding fault current impulse therethrough, comprising an armature actuable towards one end thereof to open a switch in said circuit, electrical armature windings in said circuit responsive to each fault current impulse through said circuit for actuating said armature towards said one end, said armature having two spaced leg portions with a spring biased dog pivotally mounted therebetween, said dog movable simultaneously with said armature towards said one end, a spring biased arm biased to a position between said leg portions into the path of movement of said dog towards said one end, said dog making contact with said arm upon said preceding fault current impulse whereby said arm is moved out of said path of movement and from said position, said dog and arm contact upon said preceding fault current impulse arresting movement of said armature towards said one end, and means for delaying movement of said arm to said path of movement and said position subsequent to said preceding fault current impulse whereby said dog will clear said arm upon said subsequent current impulse whereby said armature is free to cause opening of said switch.

8. A fault responsive device comprising an armature actuatable towards one end thereof and electrical armature windings for actuating said armature towards said one end, said armature having two spaced leg portions with a dog pivotally mounted therebetween, said dog movable simultaneously with said armature towards said one end, a pivotally mounted arm biased to a position between said spaced leg portions into the path of movement of said dog towards said one end, arm spring biasing means for biasing said arm to said position and said path of movement, and dog spring biasing means for biasing said dog away from said arm, said arm and dog being spring biased for pivotal movement in the same direction, said armature movable towards said one direction upon a fault current impulse through said windings, said dog making contact with said arm upon a first fault current impulse through said windings whereby movement of said armature towards said one end is arrested, said dog and arm pivotal simultaneously in a direction opposite to said same direction upon said dog and arm contact whereby said arm is moved out of said position from said path of movement, and means for delaying movement of said arm to said position and said path of movement against the action of said arm spring biasing subsequent to said first fault current impulse whereby upon a subsequent fault current impulse following said first fault current impulse said dog will clear said arm and said armature will be free for unarrested actuation towards said one end.

9. A fault responsive device comprising an armature having two spaced parallel leg portions, a dog pivotally mounted therebetween, an armature winding for actuating said armature towards one end thereof, said dog having a pointed end, said dog movable simultaneously with said armature towards said one end, said dog spring biased by a dog spring biasing means whereby said pointed end points towards said one end, a pivotally mounted arm spring biased by an arm spring biasing means to a position between said leg portions in the path of movement of said pointed dog towards said one end, said arm having a plurality of notches thereon, said armature actuatable towards said one end in response to a fault current impulse through said windings, said arm and dog spring biasing means biasing said arm and dog for pivotal movement in the same direction, said dog engaging a successive one of said notches upon successive fault current impulses through said windings, said successive dog and notch engagements arresting movement of said armature towards said one end, said successive dog and notch engagements causing succesive periodic pivotal movement of said arm to a location disposed away from said position and said path of movement, said arm and dog pivotal simultaneously in a direction opposite to said same direction against the action of said arm and dog spring biasing means during each of said successive dog and notch engagements, and time delay means for delaying movement of said arm towards said position and path of movement following each of said successive periodic pivotal arm movements whereby upon a subsequent fault current impulse following said successive fault current impulses said dog will clear said arm and said notches whereby said armature will be free for unarrested movement towards said one end in response to said subsequent fault current impulse.

10. A fault responsive circuit having means for opening said circuit responsive to and during the existence of a subsequent fault current impulse therethrough following a preceding fault current impulse therethrough, comprising an elongated armature actuatable in a lengthwise direction towards one end thereof to engage and open a switch in said circuit, electrical armature windings in said circuit responsive to each fault current impulse through said circuit for actuating said armature towards said one end, said armature having a dog thereon and movable therewith towards said one end, and an arm positioned in the path of movement of said dog towards said one end, said dog engageable with said arm upon said preceding fault current impulse for preventing complete movement of said armature to said one end and moving said arm outward of said path of movement of said dog, means preventing said arm from returning to a position to engage said dog upon a closely following subsequent fault current impulse, whereby said armature is free to move to said one end.

11. In a fault responsive circuit as in claim 10, wherein said arm is biased by an arm biasing means into said path of movement.

References Cited in the file of this patent
UNITED STATES PATENTS

| | | |
|---|---|---|
| 1,134,752 | Leonard | Apr. 6, 1915 |
| 1,866,371 | Prince | July 5, 1932 |
| 2,068,620 | Spurgeon | Jan. 19, 1937 |
| 2,125,157 | Gamel | July 26, 1938 |
| 2,289,179 | Coy | July 7, 1942 |
| 2,452,233 | Gerrard et al. | Oct. 26, 1948 |
| 2,464,303 | Gesellschap | Mar. 15, 1949 |
| 2,509,892 | Steinmayer et al. | May 30, 1950 |
| 2,564,701 | Lincks | Aug. 21, 1951 |
| 2,575,931 | Smith, Jr. | Nov. 20, 1951 |
| 2,587,341 | Lincks | Feb. 26, 1952 |

FOREIGN PATENTS

| | | |
|---|---|---|
| 487,666 | Great Britain | June 21, 1938 |